United States Patent [19]
Krueger

[11] Patent Number: 5,908,106
[45] Date of Patent: Jun. 1, 1999

[54] WIRE BELT SPLICE EDGE CONNECTOR

[75] Inventor: Karl Krueger, Chester, N.H.

[73] Assignee: Wire Belt Company of America, Londonderry, N.H.

[21] Appl. No.: 08/902,085

[22] Filed: Jul. 29, 1997

[51] Int. Cl.$^6$ .................................................. B65G 15/54
[52] U.S. Cl. ........................................................... 198/848
[58] Field of Search .......................... 198/848, 844.2; 24/39, 33 P, 33 C

[56] References Cited

U.S. PATENT DOCUMENTS

| | | | |
|---|---|---|---|
| D. 319,328 | 8/1991 | Faulkner | D34/29 |
| 507,865 | 10/1893 | White | |
| 1,009,670 | 11/1911 | Kihlgren | |
| 1,895,345 | 1/1933 | Pink | |
| 2,826,383 | 3/1958 | Spencer, Jr. | 245/10 |
| 2,862,602 | 12/1958 | Greer et al. | 198/182 |
| 3,794,155 | 2/1974 | Bechtel, Jr. | 198/194 |
| 3,958,686 | 5/1976 | Bradford | 198/848 |
| 4,036,352 | 7/1977 | White | 198/778 |
| 4,262,392 | 4/1981 | White | 24/36 |
| 4,410,083 | 10/1983 | Poerink | 198/853 |
| 4,754,871 | 7/1988 | Gustafson | 198/848 |
| 4,846,339 | 7/1989 | Roinestad | 198/852 |
| 4,937,921 | 7/1990 | Musil | 24/33 |
| 4,944,716 | 7/1990 | Graff | 474/255 |
| 4,996,750 | 3/1991 | Musil | 24/33 |
| 5,065,860 | 11/1991 | Faulkner | 198/848 |
| 5,069,331 | 12/1991 | Bartkowiak | 198/848 |
| 5,123,523 | 6/1992 | Langlois et al. | 198/844.1 |
| 5,158,171 | 10/1992 | Graff | 198/848 |
| 5,176,249 | 1/1993 | Esterson et al. | 198/850 |
| 5,190,143 | 3/1993 | Froderberg et al. | 198/778 |
| 5,217,577 | 6/1993 | Steiner | 162/232 |
| 5,334,440 | 8/1994 | Halterbech et al. | 428/222 |
| 5,375,695 | 12/1994 | Daringer et al. | 198/778 |
| 5,404,998 | 4/1995 | Frye | 198/848 |
| 5,501,319 | 3/1996 | Larson et al. | 198/778 |

*Primary Examiner*—William E. Terrell
*Assistant Examiner*—Khoi H. Tran
*Attorney, Agent, or Firm*—Bourque & Associates, PA

[57] ABSTRACT

A wire belt splice edge connector is used to connect a wire link to a splice link in a wire belt splice connection proximate an edge of a wire belt. The splice edge connector includes first and second edge connector leg portions, a wire link receiving portion disposed between first ends of the first and second edge connector leg portions, and first and second splice link receiving portions disposed proximate a second end of the first and second edge connector leg portions. The splice link receiving portions, such as loops, receive and interlock with a splice link, and the wire link receiving portion receives and interlocks with a wire link in the wire belt. The edge connector leg portions are substantially parallel to one another forming a U shape with the wire link receiving portion. The wire link receiving portion forms an obtuse angle with respect to the edge connector leg portions.

12 Claims, 2 Drawing Sheets

WIRE BELT SPLICE EDGE CONNECTOR

FIELD OF THE INVENTION

The present invention relates to wire belts having splice connections and in particular, to a wire belt splice connector, for connecting the edges of a wire belt splice connection.

BACKGROUND OF THE INVENTION

Wire belts are commonly used for conveying articles during cooling, drying, coating, cooking and many other applications. In one particular application, wire belts are used to convey food articles during cooking or processing of the food. Wire belts are advantageous for food processing because they provide an open flow through mesh, a high degree of flexibility, a sanitary construction, simple installation and maintenance, and the ability to be positively driven. The wire belt typically includes a plurality of wire links interlocked or joined together to form an endless conveyor belt. Forming an endless conveyor from a wire belt typically requires a splice connection between two of the wire links in the wire belt.

Existing splice connections have presented a problem, particularly when wire belts are used in the food industry. One such splice connection is disclosed in U.S. Pat. No. 3,794,155 to Bechtel, Jr. According to this patent, an end connecting element or link 26 is used at the end of the splice connection. Many disadvantages have been encountered when using wire belts having this type of end connecting element or link.

The end connecting links in prior art wire belt splice connections do not provide enough support for the loads placed on the wire links at the edge of the wire belt where failure is most likely to occur. When the end connecting link does not adequately support the load at the edge of the wire belt and the wire links bend or break, the existing end connecting links can easily disconnect from the wire belt. In food processing applications, the end connecting links often fall into the food, resulting in a contaminated and hazardous food product. A further disadvantage of the existing end connecting links is that the links used on one side of the wire belt must be formed differently from the links used on the other side.

Accordingly, what is needed is a wire belt splice connector that increases the support of loads at the edge of a splice connection in a wire belt. What is also needed is a wire belt splice connector that will not easily disconnect from the wire belt even if a failure or breakage of the wire links occurs. Further, a wire belt splice connector is needed that can be mass produced to fit on either edge of the wire belt.

SUMMARY OF THE INVENTION

The present invention features a wire belt splice connector for connecting a wire link to a splice link in a wire belt splice connection, for example, proximate an edge of the wire belt. The wire belt splice connector includes first and second edge connector leg portions, each having first and second ends. A wire link receiving portion is disposed between the first end of each first and second connector leg portion, for receiving and linking with a portion of the wire link. First and second splice link receiving portions are disposed at the second end of each respective first and second connector leg portions, for receiving and linking with the splice link.

According to the preferred embodiment, the first and second connector leg portions are substantially parallel. The first and second connector leg portions substantially lie in a first plane, and the wire link receiving portion substantially lies in a second plane forming an obtuse angle with the first plane. In one embodiment, the first and second connector leg portions and the wire link receiving portion form a U-shape.

The first and second splice link receiving portions preferably include first and second closed loops extending from respective first and second edge connector leg portions.

The present invention also features a wire belt comprising a plurality of wire links interlocked with at least one adjacent wire link. The plurality of wire links include at least first and second wire links being spliced together at a splice connection. At least a first wire link connector is interlocked with the first wire link and at least a second wire link connector is interlocked with the second wire link. A splice link is interlocked with both the first wire link connector and the second wire link connector to form a splice connection between the first and second wire links. The wire belt further comprises at least one wire belt splice edge connector, as defined above, connecting the first of the plurality of wire links to the splice link proximate an edge of the wire belt.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1B:
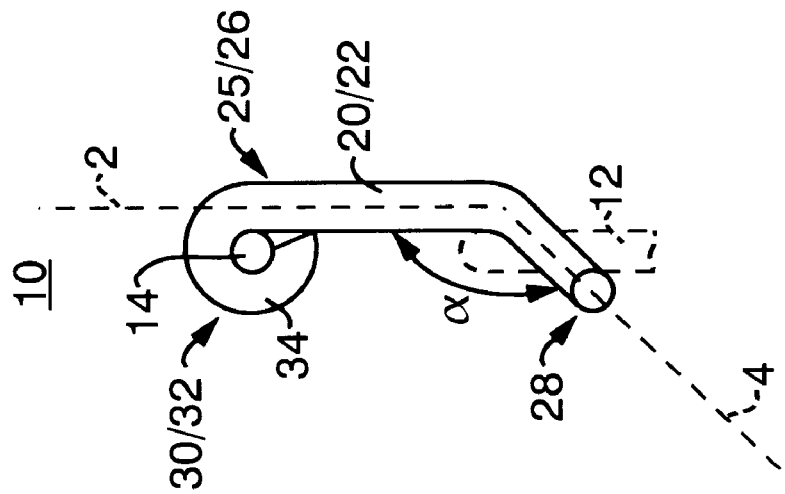
FIG. 1B is a side view of the wire belt splice connector according to the present invention.
Figure 1A:
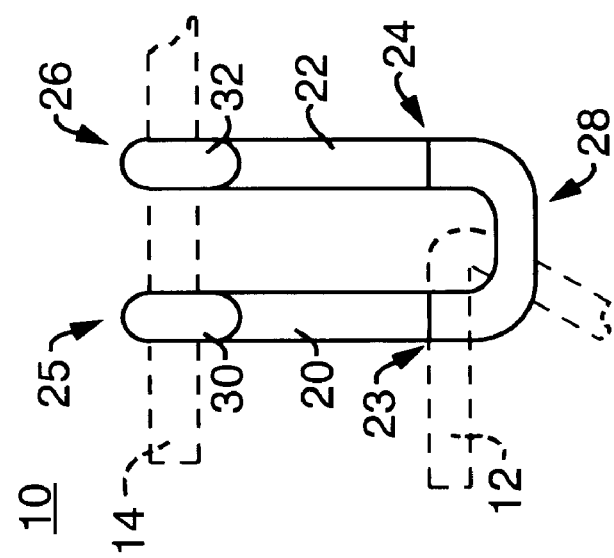
FIG. 1A is a front view of the wire belt splice connector according to the present invention.

A wire belt splice connector 10, FIGS. 1A and 1B, according to the present invention, is used to connect a wire link 12 to a splice link 14 in a wire belt splice connection, preferably at the edges of the splice connection, as will be described in greater detail below. Each wire belt splice connector 10 includes first and second connector leg portions 20, 22, having respective first ends 23, 24 and respective second ends 25, 26. A wire link receiving portion 28 is disposed between the first ends 23, 24 of the respective first and second connector leg portions 20, 22, for receiving and linking with a portion of the wire link 12. First and second splice link receiving portions 30, 32 are disposed proximate the second ends 25, 26 of each respective first and second edge connector leg portions 20, 22, for receiving and linking with the splice link 14.

According to a preferred embodiment, the first and second connector leg portions 20, 22 are substantially parallel and form a substantially U-shape with the wire link receiving portion 28. The preferred embodiment of the first and second splice link receiving portions 30, 32, FIG. 1B, include a loop 34 formed proximate the respective second ends 25, 26 of the connector leg portions 20, 22. The loop 34 is preferably a closed loop that slidably receives the splice link 14 such that the wire belt splice connector 10 is interlocked with the splice link 14 and allowed to pivot with respect to the splice link 14.

The preferred embodiment also includes the wire link receiving portion 28 forming an obtuse angle α with respect to first and second connector leg portions 20, 22. The first and second connector leg portions 20, 22 lie substantially in a first plane 2 and the wire link receiving portion 28 lies substantially in a second plane 4 that forms obtuse angle a with respect to the first plane 2. The angled wire link receiving portion 28 allows a wire link 12 to be received in the wire link receiving portion 28 substantially in alignment with the splice link 14 such that the wire belt will not be distorted or lose pitch at the edge of the wire belt.

According to one example, the first and second edge connector leg portions 20, 22 have a length in a range of about 0.187" to 0.800" and a spacing of about ¼". The obtuse angle α is in a range of about 45°.

Figure 2:
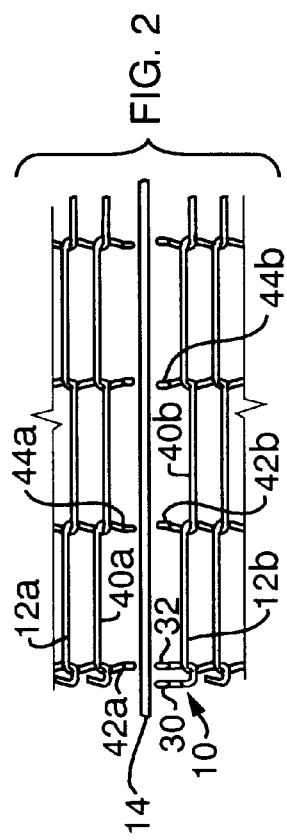
FIG. 2 is a top view of an unassembled splice connection according to the present invention.

In a splice connection, first and second wire links 12a, 12b FIG. 2, are spliced together, for example, to form an endless wire belt. At least first and second wire link connectors 40a, 40b are interlocked with respective first and second wire links 12a, 12b. The wire link receiving portion 28 of the splice connector 10 receives or interlocks with a portion of the second wire link 12b. A splice link 14 is adapted to be interlocked with each wire link connector 40a, 40b and splice connector 10 to form the splice connection.

One example of the wire links 12a, 12b include wire links having an undulating shape, such as a modified square sign wave. The wire link connectors 40a, 40b are dimensioned to match the undulations of the wire links 12a, 12b so that they can be interlocked with the wire links 12a, 12b. The present invention contemplates wire links of other suitable shapes. The wire links 12a, 12b, wire link connectors 40a, 40b, splice link 14, and splice connectors 10 are typically made of stainless steel or any other suitable metal or non-metal.

In the preferred embodiment, a series of first wire link connectors 40a are interlocked with the first wire link 12a, and a series of second wire link connectors 40b are interlocked with the second wire link 12b. Each of the first and second wire link connectors 40a, 40b include first and second splice link receiving portions 42a, 44a, 42b, 44b, such as a loop. The splice link 14 is preferably an elongate rod that is slidably received through each of the splice link receiving portions 42a, 44a, 42b, 44b of the wire link connectors 40a, 40b, and through each of the splice link receiving portions 30, 32 of the wire belt splice connector 10.

Figure 3:
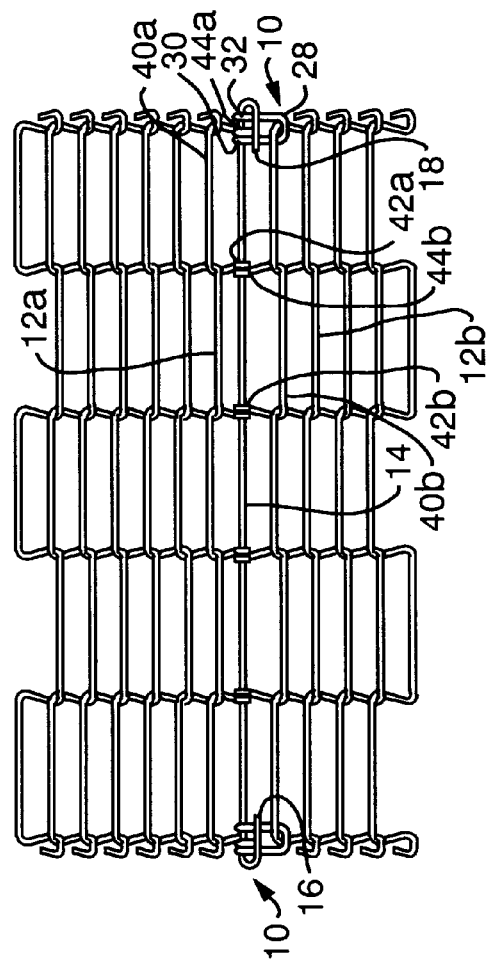
FIG. 3 is a top view of an assembled splice connection according to the present invention.

When assembled in a wire belt 50, FIG. 3, the splice link receiving portions 42a, 44a, 42b, 44b of each wire link connector 40a, 40b and the splice link receiving portions 30, 32 of each wire belt splice connector 10 are aligned and interlocked with the splice link 14. The ends 16, 18 of the splice link 14 are then secured, for example, by bending around the wire belt splice connector 10. The first and second wire links 12a, 12b are thereby coupled together in a splice connection.

The splice link receiving portions 30, 32 of the wire belt splice connector 10 are preferably disposed on either side of one of the splice link receiving portions 44a of a wire link connector 40a proximate the edge of the wire belt 50. The two splice link receiving portions 30, 32 of the splice connector 10 provide a double shear that strengthens the edge of the wire belt 50 at the splice connection. Having the first and second splice link receiving portions 30, 32 of the splice connector 10 on opposite sides of the splice link receiving portion 44a of the wire link connector 40a further prevents the splice connector 10 from being disconnected if one of the wire links fails or breaks, thereby preventing hazardous pieces from contaminating the food product.

The wire belt 50 preferably includes a splice connector 10 at both edges of the splice connection. Identical splice connectors 10 can be used for either edge of the wire belt 50 and can therefore be mass produced according to one consistent design.

Figure 4:
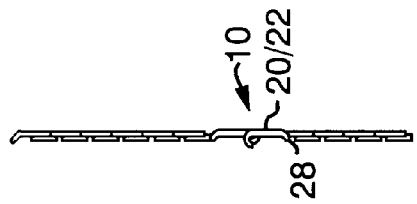
FIG. 4 is a side view of a wire belt with a wire belt splice connector according to the present invention.

The wire belt splice edge connector 10, FIG. 4, having a wire link receiving portion 28 angled with respect to the edge connector leg portions 20, 22 allows the spliced wire belt 50 to lie substantially in a straight line and prevents distortion in the wire belt. Although the splice connector 10 is shown at the edge of the splice connection, the present invention contemplates using the splice connector 10 at any point along the splice connection to strengthen or reinforce the splice connection.

Accordingly, the wire belt splice connector of the present invention provides added support at the edge of a splice connection in a wire belt to prevent failure or distortion of the wire belt. The wire belt splice connector is also prevented from easily disconnecting from the wire links and/or splice link if a failure of the wire belt does happen to occur. A single design of the wire belt splice connector can be mass produced, used on either edge of various types of wire belts, and used on various size or pitch wire belts.

Modifications and substitutions by one of ordinary skill in the art are considered to be within the scope of the present invention which is not to be limited except by the claims which follow.

What is claimed is:

1. A wire belt splice connector, for connecting a wire link to a splice link in a wire belt splice connection of a wire belt, said wire belt splice connector comprising:

first and second connector leg portions, each of said first and second connector leg portions having a first end and second end;

a wire link receiving portion, disposed between said first end of each of said first and second connector leg portions, for receiving and linking with a portion of said wire link, wherein said first and second connector leg portions lie substantially in a first plane, and said wire link receiving portion lies substantially in a second plane, said second plane forming an obtuse angle with said first plane; and first and second splice link receiving portions, disposed proximate said second end of each said first and second connector leg portions, for receiving and linking with said splice link.

2. The wire belt splice connector of claim 1 wherein said first and second connector leg portions are substantially parallel.

3. The wire belt splice connector of claim 1 wherein said first and second connector leg portions have a spacing of about ¼ inches.

4. The wire belt splice connector of claim 1 wherein said first and second connector leg portions and said wire link receiving portion form a U shape.

5. The wire belt splice connector of claim 1 wherein said first and second splice link receiving portions include first and second closed loops extending from respective said second ends of said first and second connector leg portions.

6. A wire belt splice edge connector, for connecting a wire link to a splice link in a wire mesh belt at an edge of said wire mesh belt, said wire belt splice edge connector comprising:

first and second edge connector leg portions disposed substantially parallel to one another, each of said first and second edge connector leg portions having a first and second end;

a wire link receiving portion,. disposed between said first end of each said first and second edge connector leg portions, for receiving and linking with a portion of said wire link, wherein said first and second edge connector leg portions lie in a first plane and said wire link receiving portion lies in a second plane, said second plane forming an obtuse angle with said first plane; and first and second splice link receiving portions, disposed at the second end of each respective said first and second edge connector leg portions, for receiving and linking with said splice link.

7. A wire belt comprising:

a plurality of wire links, each of said plurality of wire links being interlocked with at least one adjacent wire link, said plurality of wire links including at least first and second wire links spliced together at a splice connection;

at least a first wire link connector interlocked with said first wire link of said plurality of wire links;

at least a second wire link connector interlocked with said second wire link of said plurality of wire links;

a splice link, interlocked with both said first wire link connector and said second wire link connector, and forming said splice connection between said first and second wire links; and at least one wire belt splice edge connector, connecting one of said first and second wire links to said splice link at an edge of said wire belt, said at least one wire belt splice edge connector comprising:

first and second edge connector leg portions, each of said first and second edge connector leg portions having a first end and second end;

a wire link receiving portion, disposed between said first end of each said first and second edge connector leg portions, for receiving and linking with a portion of one of said first and second wire links; and first and second splice link receiving portions, disposed proximate said second end of each said first and second edge connector leg portions, for receiving and linking with said splice link.

8. The wire belt of claim 7 wherein each of said plurality of wire links have an undulating shape, and wherein said first wire link connector and said second wire link connector interlock with a corresponding undulation of respective said first and second wire links.

9. The wire belt of claim 7 wherein at least one-end of said splice link is bent around said first and second splice link receiving portions of said at least one wire belt splice edge connector.

10. The wire belt of claim 7 wherein said at least one wire belt splice edge connector includes a wire belt splice edge connector proximate first and second edges of said wire belt.

11. The wire belt of claim 7 wherein said first and second edge connector leg portions are substantially parallel.

12. The wire belt of claim 7 wherein said first and second edge connector leg portions lie substantially in a first plane, and said wire link receiving portion lies substantially in a second plane, said second plane forming an obtuse angle with said first plane.

* * * * *